Carter & Rees.

Making Nuts and Washers.

No. 313. Reissued Jun. 19, 1855.

THE GRAPHIC CO. PHOTO-LITH. 39 & 41 PARK PLACE, N.Y.

UNITED STATES PATENT OFFICE.

HENRY CARTER AND JAMES REES, OF PITTSBURG, PENNSYLVANIA.

NUT AND WASHER MACHINE.

Specification forming part of Letters Patent No. 8,322, dated August 26, 1851; Reissue No. 313, dated June 19, 1855.

*To all whom it may concern:*

Be it known that we, HENRY CARTER and JAMES REES, of the city of Pittsburg, county of Allegheny, and Commonwealth of Pennsylvania, have invented a new, useful, and Improved Mode of Manufacturing Nuts for Bolts, &c.; and we do hereby declare that the following is a full and exact description of our machine for accomplishing the same, reference being had to the accompanying drawings, and to the letters of reference marked thereon.

Figure 1:
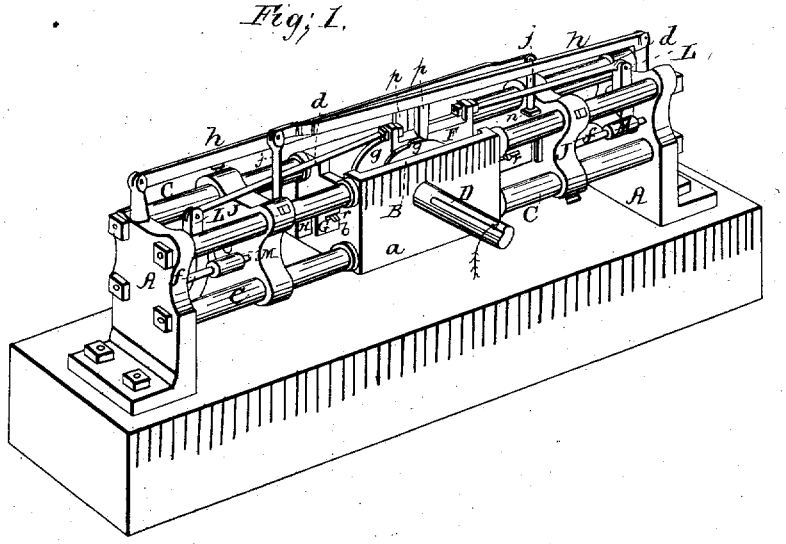
Figure 3:
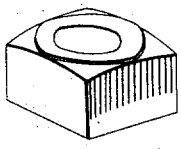
Figure 2:
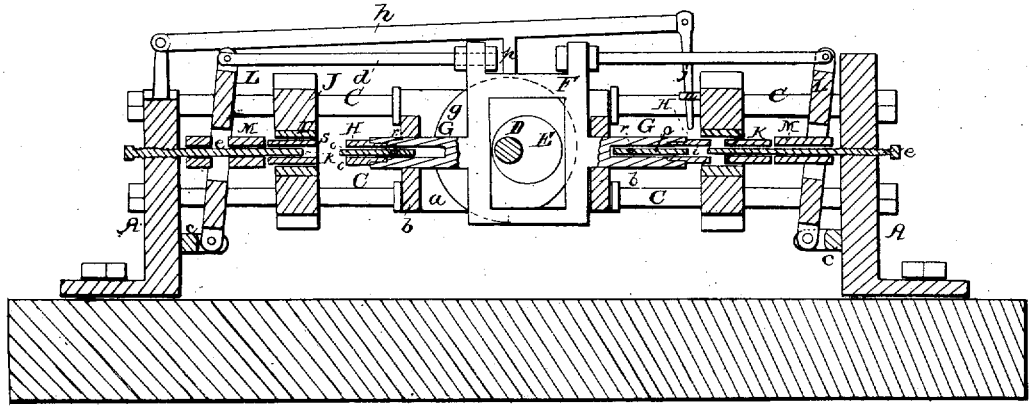

Figure 1 represents a view in perspective of our nut-machine. Fig. 2 is a vertical longitudinal section of the same through the center of the dies. Fig. 3 is a view in perspective of a full-sized nut formed by the machine.

In our machine the nuts are formed in succession from a heated bar of iron, and are punched and compressed into shape while the nut is on the punch, at one operation, within a box-die which surrounds the blank and prevents it from being unduly strained during the operation of punching. The reducing of the punched blank to the proper shape requires, at the moment it is effected, the exertion of a very considerable force. This operation in our machine is effected by compressing the blank between two dies, which are both moved in the same direction and by the same eccentric, but with different speed, and while the blank is upon the punch.

The machine represented in the accompanying drawings is double-acting, and consists of a strong frame, to which the several acting members of the machine are secured. The frame is composed of two head-blocks, A A, which face each other, the two being situated at the opposite extremities of the machine. Between these two head-blocks, and at an equal distance from each, is the block B, which supports the driving apparatus to which the power is applied. The block B is connected with each head-block by means of four strong bars, C C C C, which tie the whole together, and, with the head and middle blocks, constitute the frame of the machine. The middle block, B, is hollow, and its opposite sides *a a* are perforated to admit a shaft, D, which extends transversely through it, its journals being supported in suitable brasses in the sides of the block. An eccentric, E, is secured to the middle of this shaft, and a rectangular frame, F, is fitted thereto. This frame carries two pistons, G G, which project from its opposite sides and traverse corresponding openings in the opposite ends *b b* of the middle block. These pistons have sockets in their projecting extremities, in which dies H are secured, by means of which the blank is cut from the bar presented to the machine, and is forced into the die-box I, the cavity of which is of a size and shape corresponding to that of the nut to be formed. It is secured in a block, J, which is made fast to the four bars C C C C. The bottom of the die-box is formed by the counter-die K, which moves freely in the box, and whose face is the counterpart of the head of the nut. This die is perforated to admit a smaller stationary punch, *e*, by means of which the hole or eye is formed in the blank. This punch is secured at its hinder extremity in the adjacent head-block A. The cutting-die has a socket, *i*, in it to receive the piece punched out of the blank to form the eye. This socket is extended into the piston G, and is fitted with a sliding bolt, *o*. The latter has a key, *r*, in its hinder extremity, which passes through slots in the opposite sides of the piston, and, as the latter is moved inward or toward the shaft by the revolution of the eccentric, strikes the face of the middle block and stops the movement of the bolt *o*, while the piston still continues to move inward. The die K, which shapes the head of the nut, is moved to and fro by means of a lever, L, which is hinged at its lower extremity to a bracket, *o*, on the head-block, and is connected at its upper extremity with the eccentric-frame F by a rod, *d*. This lever acts upon the arms of a cross-head, M, which slides on guides *f*, and whose hub bears against and gives motion to the head-shaping die K, allowing the latter to move backward as the cutting-die is advanced and forcing it forward as the cutting-die is withdrawn. The two dies move simultaneously in the same direction. A notched disk, *g*, is secured to each side of the eccentric E, and two levers, *h h*, are pivoted to standards on the opposite head-blocks. Each lever extends over one of the disks *g* to the die-block J beyond. It is here fitted with a bolt, *j*, which depends from the extremity of the lever and passes through a guide, *n*, above the die. At that part of each lever where it passes over its corresponding disk an arm, *p*, is secured to it, which bears upon the periphery of the disk, and, as the latter is revolved, enters the notch therein, thus permitting the lever to descend by its weight and depress the bolt. As the disk moves onward, the notched portion presses the arm, and the lever is again raised to its uppermost position. The notched part of the disk is set in such a position with respect to the eccentric that when the head-shaping die reaches its most forward position the bolt *j* shall be depressed to strike the new-formed nut and detach it from the face of the counter-die.

When nuts are to be formed with this machine, the eccentric shaft is caused to revolve in the direction indicated by the arrow in the drawings by means of some suitable mechanical device which conveys power to it from the prime mover of the establishment. Flat bars, previously heated and sufficiently narrow to enter easily in the die box, are thrust forward in front of the two cutting-dies H alternately until their extremities strike gage-blocks *s*, which are secured to the die-blocks J, and limit the distance to which the bars can be thrust forward. As then each cutting-die moves forward, it forces the portion of the bar in front of it into the die-box, thus severing it from the rest of the bar. As the blank thus severed is forced into the die-box, it is forced against the eye-punch *e*, which punches the metal from the center of the blank into the socket in the cutting-die. As the cutting-die continues to advance faster than the head-shaping die can retrograde, the punched blank is squeezed between the two, and as this operation takes place as the eccentric is imparting the slowest longitudinal movement to the dies, and as the one die is retrograding half as fast as the other is advancing, a very great force is at the moment exerted by this differential movement to compress the blank into the depressions of the head-shaping die, and thus reduce it to the proper form. As the eccentric continues to revolve, the cutting-die is withdrawn from the die-box, while by the same operation the head-shaping die is moved forward, and, shoving the finished nut before it, expels it from the die-box. As the nut is thus protruded from the die-box, the lever *h* is allowed to fall, and the bolt *j*, striking the nut, detaches it from the face of the die. As the cutting-die continues to move backward, the key *r* of the sliding bolt in the socket thereof strikes the face of the middle block, B, and stops its further movement with the punch. As then the latter continues to move, the piece punched from the eye of the nut which was received in the socket of the cutting-die is ejected therefrom. The machine is now ready to form another nut from the heated bar, which is again fed up to the gage. As the two cutting-dies act alternately, a nut is formed at each end of the machine by one revolution of the shaft. The punching and compressing of the blank are effected, as above described, while the latter is within the die-box. It is therefore supported at its sides by the sides of the die-box, which prevent the enlargement or straining of the nut under the action of the eye-punch, and is compressed between the cutting and counter dies while the nut is on the eye-punch and within the die-box. The pressure given the nut while in the die-box adds greatly to its strength, as the fibers of the iron are rendered more compact, and the pressure coming direct on the flat way of the bar, the body or grain of the iron is not only preserved, but greatly improved.

The method of forming nuts by punching and pressing in a close die-box at one operation is a great advantage, as nuts of a perfectly symmetrical form are thereby rapidly produced, and all cracks incident to the cutting or punching of it are thoroughly welded up, while the exterior of the nut is forced so strongly into the molded faces of the dies that when discharged from the machine it is nearly equal in smoothness to a nut that has been planed.

Although in the operation of our machine the nut is punched and then pressed between the cutting-die and counter-die while the nut is on the punch, yet the same result may be accomplished by a slight alteration in the movement given to the dies, and giving motion to the punch, so that the blank severed from the bar may be first pressed between the two dies while in the die-box and punched while thus compressed, which would accomplish substantially the same result.

We are aware that Isaac H. Steer, about the year 1840, proposed to make nuts by the process we have here described, but never complated a machine which would do this automatically. Therefore we do not claim this process in itself and irrespective of machinery; but, being the first to construct a machine capable of making nuts by this process without any other or further manipulation than is required for feeding in the bar of iron,

We claim as our invention and desire to secure by Letters Patent—

The machine, substantially as herein described, for making nuts by cutting the blank from a heated bar of iron, punching its eye in a closed die-box, pressing it into shape while in the die-box and on the punch, and then discharging it, as specified.

HENRY CARTER.
JAMES REES.

Witnesses:
A. BAIRD,
R. REES.